US012202136B2

(12) United States Patent
Shibata et al.

(10) Patent No.: US 12,202,136 B2
(45) Date of Patent: Jan. 21, 2025

(54) AUTOMATIC LUBRICATION ROBOT

(71) Applicant: KAWASAKI JUKOGYO KABUSHIKI KAISHA, Kobe (JP)

(72) Inventors: Takeshi Shibata, Kobe (JP); Ryota Ono, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/283,930

(22) PCT Filed: Mar. 16, 2022

(86) PCT No.: PCT/JP2022/011772
§ 371 (c)(1),
(2) Date: Sep. 25, 2023

(87) PCT Pub. No.: WO2022/202509
PCT Pub. Date: Sep. 29, 2022

(65) Prior Publication Data
US 2024/0051158 A1    Feb. 15, 2024

(30) Foreign Application Priority Data
Mar. 24, 2021    (JP) .................................. 2021-049356

(51) Int. Cl.
*B25J 19/00*    (2006.01)
(52) U.S. Cl.
CPC .................................. *B25J 19/0062* (2013.01)

(58) Field of Classification Search
CPC ......... B25J 19/0062; F16N 7/14; F16N 11/10; F16N 13/02
See application file for complete search history.

(56) References Cited

U.S. PATENT DOCUMENTS 7,316,966 B2 *    1/2008    Kurita ............... H01L 21/67201
438/758

FOREIGN PATENT DOCUMENTS

| JP | H11-216689 A | 8/1999 |
| JP | 3781071 B2 | 5/2006 |
| JP | 5565479 B1 | 8/2014 |
| JP | 2021-042764 A | 3/2021 |

OTHER PUBLICATIONS

Jun. 7, 2022 International Search Report issued in International Patent Application No. PCT/JP2022/011772.

* cited by examiner

*Primary Examiner* — William C Joyce
(74) *Attorney, Agent, or Firm* — Oliff PLC

(57) ABSTRACT

An automatic lubrication robot includes a robot, a grease hose, and a delivery unit. The robot includes a lifting and lowering unit that moves linearly and an arm coupled to the lifting and lowering unit, and the robot is arranged in a clean room to perform an operation. Grease for lubricating the robot passes through the grease hose. In response to the linear movement of the lifting and lowering unit, the delivery unit delivers the grease to the robot via the grease hose.

7 Claims, 5 Drawing Sheets

AUTOMATIC LUBRICATION ROBOT

TECHNICAL FIELD

The present invention mainly relates to a robot that automatically supplies a lubricant.

BACKGROUND ART

The robot includes a plurality of movable units. The lubricant needs to be supplied to the movable units every time a predetermined period of time elapses. However, when the lubricant is manually supplied to the robot, it is necessary to attach and detach a cover of the robot, and thus, the amount of work is great. Patent Literatures 1 and 2 disclose techniques related to supplying a lubricant.

Patent Literature 1 discloses a structure for facilitating an operation of supplying grease to a vacuum robot. A rotor frame of the vacuum robot is formed with a grease injection hole for injecting grease. A vacuum case covering the rotor frame is formed with a grease injection operation hole for inserting a syringe or the like. A lid for airtightly sealing the grease injection operation hole is attachable to and detachable from the grease injection operation hole.

Patent Literature 2 discloses a grease supply apparatus that automatically supplies grease to a traveling device to which a robot is mounted. The grease supply apparatus includes a gas cylinder unit and a grease supply pipe unit. By the pressure of the gas in the gas cylinder unit, the grease is delivered in a constant amount during a constant period of time. The grease delivered from the gas cylinder unit is supplied to the traveling device via the grease supply pipe unit.

CITATION LIST

Patent Literature

[PTL 1] Japanese Patent No. 3781071
[PTL 2] Japanese Patent No. 5565479

SUMMARY OF INVENTION

Technical Problem

In the structure of Patent Literature 1, a worker needs to perform the work of supplying the lubricant, and thus, the amount of work is great for the worker. In the structure of Patent Literature 2, it is necessary to finely adjust the gas cylinder unit so that the grease is supplied at a required frequency and in a required amount.

The present invention has been contrived in view of the above circumstances, and a main object thereof is to provide an automatic lubrication robot capable of automatically supplying a lubricant to a robot without performing a complicated adjustment.

Solution to Problem

The problems to be solved by the present invention are as described above. Next, means for solving the problems and effects of these means will be described.

According to an aspect of the present invention, an automatic lubrication robot having the following configuration is provided. That is, the automatic lubrication robot includes a robot, a supply path, and a delivery unit. The robot includes a linear movement unit that moves linearly and an arm coupled to the linear movement unit, and the robot is arranged in a clean room to perform an operation. A lubricant for lubricating the robot passes through the supply path. In response to the linear movement of the linear movement unit, the delivery unit delivers the lubricant to the robot via the supply path.

Thus, it is possible to automatically supply the lubricant to the robot, so that the amount of work can be reduced. Furthermore, the lubricant is supplied due to the movement of the linear movement unit of the robot, and thus, no complicated adjustment is required.

Advantageous Effects of Invention

According to the present invention, it is possible to realize an automatic lubrication robot capable of automatically supplying a lubricant to a robot without performing a complicated adjustment.

DESCRIPTION OF EMBODIMENTS

Figure 1:
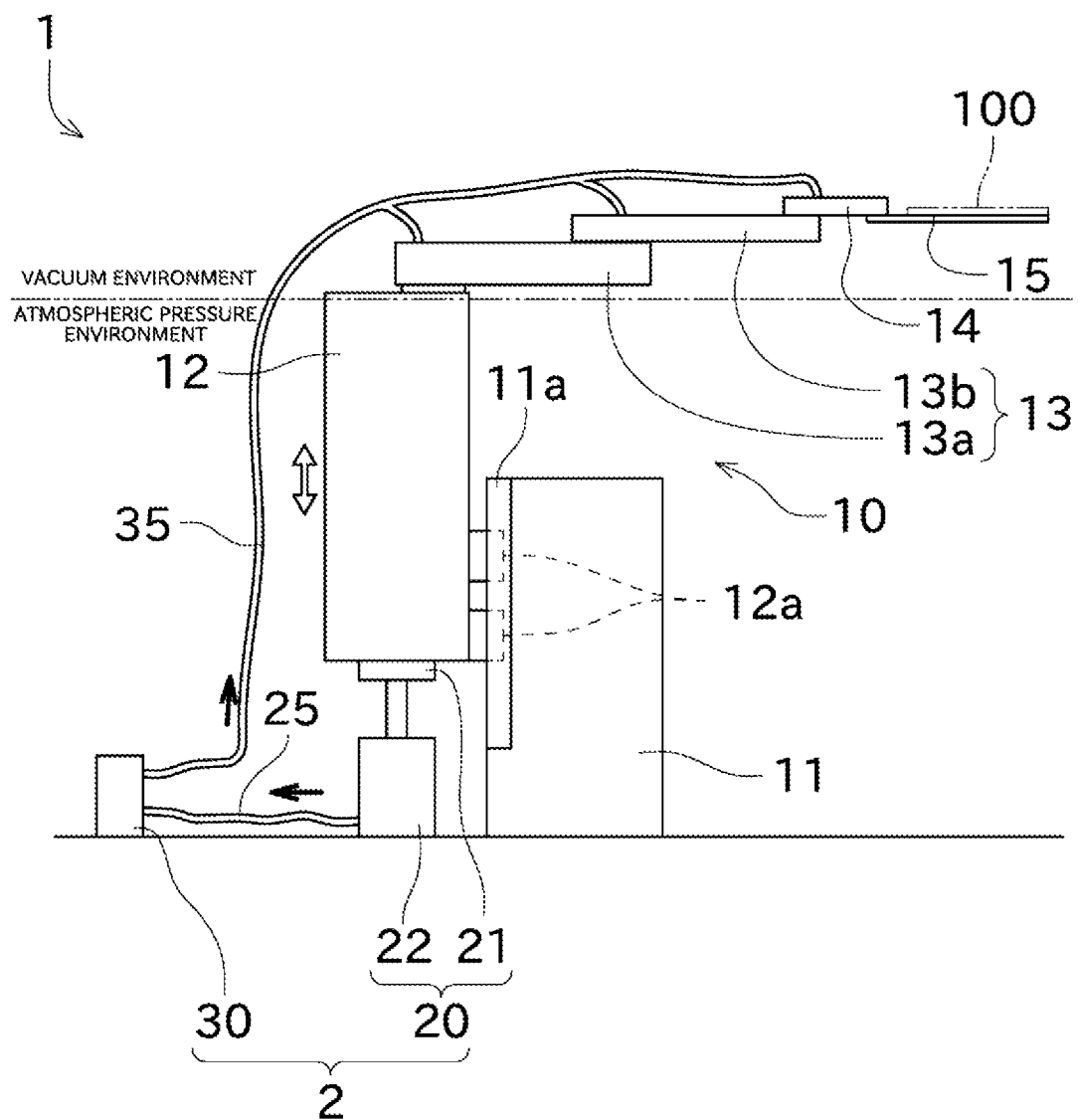
FIG. 1 is a schematic side view of an automatic lubrication robot according to a first embodiment.

Next, embodiments of the present invention will be described with reference to the drawings. FIG. 1 is a schematic side view of an automatic lubrication robot 1 according to a first embodiment.

The automatic lubrication robot 1 of the present embodiment operates in a clean room provided in a factory and the like for manufacturing semiconductor devices. Specifically, the automatic lubrication robot 1 performs an operation of conveying a wafer (substrate) 100. The automatic lubrication robot 1 may be configured to operate in a clean room provided in a factory for manufacturing liquid crystal panels and the like. A location where the automatic lubrication robot 1 is installed is not limited to an industrial clean room, and may be a medical clean room, for example.

As illustrated in FIG. 1, the automatic lubrication robot 1 includes a robot (robot unit) 10. The robot 10 is a SCARA-type horizontally articulated robot. SCARA is an abbreviation for Selective Compliance Assembly Robot Arm. The robot 10 is not limited to the horizontally articulated robot, and may be, for example, a vertically articulated robot. The robot 10 includes a support base 11, a lifting and lowering unit (linear movement unit) 12, an arm 13, a wrist unit 14, and a hand 15.

The support base 11 is installed on a floor of a factory or the like. The support base 11 supports the lifting and lowering unit 12, the arm 13, and the like. Note that the support base 11 may be installed on a ceiling of a factory.

The lifting and lowering unit 12 is attached to the support base 11 so as to be slidable in a vertical direction. In other words, the support base 11 is a stationary base unit, and the lifting and lowering unit 12 is a movable base unit. Specifically, the support base 11 is formed with a linear guide 11a, and the lifting and lowering unit 12 is formed with a guide piece 12a. The guide piece 12a is configured to move along the linear guide 11a. A motor that is not illustrated in the drawing is incorporated in the lifting and lowering unit 12, and the lifting and lowering unit 12 can be lifted and lowered by using power generated by the motor. The lifting and lowering unit 12 moves along the vertical direction, and thus, the lifting and lowering unit 12 moves linearly. Therefore, the lifting and lowering unit 12 corresponds to a linear movement unit.

The arm 13 is attached above the lifting and lowering unit 12. The arm 13 includes a first arm 13a and a second arm 13b. One end of the first arm 13a is rotatably coupled to the lifting and lowering unit 12, and the other end of the first arm 13a is rotatably coupled to the second arm 13b. One end of the second arm 13b is rotatably coupled to the first arm 13a, and the other end of the second arm 13b is rotatably coupled to the wrist unit 14. The wrist unit 14 is configured to rotate integrally with the hand 15. When the first arm 13a, the second arm 13b, and the wrist unit 14 rotate, rotation axes thereof are parallel to the vertical direction. That is, the arm 13, the wrist unit 14, and the hand 15 are configured to move within a substantially horizontal plane.

Motors that are not illustrated in the drawing are arranged inside the first arm 13a, the second arm 13b, and the wrist unit 14. The first arm 13a, the second arm 13b, and the wrist unit 14 can rotate independently by power generated by these motors. Note that operations of the first arm 13a, the second arm 13b, and the wrist unit 14 are controlled by a robot control device not illustrated in the drawing.

The hand 15 is attached to a tip end of the wrist unit 14. The hand 15 has a thin plate shape and is V-shaped or U-shaped in a plan view. The substrate 100 can be placed on an upper surface of the hand 15. The hand 15 may be of edge grip type, passive grip type, or suction type. The edge grip type is a configuration in which the hand 15 holds an edge of the substrate 100. The passive grip type is a configuration in which the substrate 100 placed on the hand 15 is not fixed. The suction type is a configuration (for example, a Bernoulli chuck) in which the hand 15 uses suction with negative pressure to hold the surface of the substrate 100. If the automatic lubrication robot 1 is configured to perform an operation other than conveying the substrate 100, another end effector is provided instead of the hand 15.

In the robot 10, the arm 13, the wrist unit 14, and the hand 15 are arranged in a vacuum environment. On the other hand, the support base 11 and the lifting and lowering unit 12 are arranged in an atmospheric pressure environment.

The automatic lubrication robot 1 of the present embodiment has an automatic lubrication function. The automatic lubrication function is a function by which the automatic lubrication robot 1 supplies a lubricant (in the present embodiment, grease) to the robot 10 without intervention by a person. Note that lubricating oil may be used instead of grease.

Here, when the lubricant is manually supplied, it is necessary to perform an operation of attaching and detaching a cover of the robot and an operation of supplying the lubricant, and thus, the amount of work is great. In particular, when supplying a lubricant to a robot arranged in a vacuum environment, conventionally, it is necessary to break the vacuum, and thus, the downtime increases. Furthermore, the lubricant easily vaporizes in a vacuum environment, and thus, the frequency of supplying the lubricant increases. In this respect, if the automatic lubrication function is realized, it is possible to greatly reduce the amount of work by a worker and suppress an increase in downtime.

The automatic lubrication robot 1 includes a delivery unit 2 and a grease hose (supply path) 35 as a configuration for realizing the automatic lubrication function. The delivery unit 2 includes an air pump (first delivery unit) 20 and a grease delivery unit (second delivery unit) 30.

The air pump 20 receives mechanical power and uses the mechanical power to deliver air (compressed air). The air pump 20 includes a contact unit 21 and a main body unit 22. The contact unit 21 is slidable in an axial direction (the vertical direction in the present embodiment). The main body unit 22 is shaped as a container. By sliding the contact unit 21 in a predetermined direction (downward in FIG. 1), a volume of the main body unit 22 is reduced, the pressure increases, and air is delivered. An air hose 25 is connected to the air pump 20. The air delivered by the air pump 20 is supplied to the grease delivery unit 30 via the air hose 25.

In the present embodiment, the air pump 20 is arranged in the vicinity of the robot 10. Specifically, the air pump 20 is arranged below the lifting and lowering unit 12, at a position wherein the contact unit 21 is pressed when the lifting and lowering unit 12 moves up and down. According to this configuration, the air pump 20 delivers air to the grease delivery unit 30 in response to an up-down movement (a downward movement in the present embodiment) of the lifting and lowering unit 12.

The arrangement of the air pump 20 is not limited to the position below the lifting and lowering unit 12. For example, when a relay member moving up and down integrally with the lifting and lowering unit 12 is arranged, it is only required that the air pump 20 is arranged below the relay member. The air pump 20 may be arranged above the lifting and lowering unit 12, and the air pump 20 may deliver air to the grease delivery unit 30 in response to an upward movement of the lifting and lowering unit 12.

The air hose 25 is connected to the air pump 20 and the grease delivery unit 30.

The grease delivery unit 30 is arranged in an atmospheric pressure environment. A storage unit storing grease is formed inside the grease delivery unit 30. The grease delivery unit 30 uses the air supplied from the air pump 20 to deliver the grease stored in the storage unit to the robot 10. Note that the storage unit may be externally attached to the grease delivery unit 30. The grease delivery unit 30 of the present embodiment is a lubricator, specifically a manual grease gun. Therefore, the grease delivery unit 30 does not require an electrical signal or electric power to deliver grease. Accordingly, the grease delivery unit 30 delivers grease toward the robot 10 every time air is supplied from the air pump 20. Note that, as will be described later, the grease delivery unit 30 may be configured to switch between delivering and not delivering the grease, in accordance with an electrical signal.

The grease hose 35 is connected to the grease delivery unit 30. The grease hose 35 is arranged so as to penetrate a portion separating the vacuum environment and the atmospheric pressure environment. The grease delivered by the grease delivery unit 30 is supplied to the robot 10 via the grease hose 35. Specifically, a through hole is formed in a cover of the robot 10, and the grease hose 35 is connected to the through hole. The grease hose 35 extends to the vicinity of a lubrication location of the robot 10, and the robot 10 is lubricated when the grease leaving the grease hose 35 drops onto the lubrication location. The grease hose 35 includes a slackening hose or a flexible hose, so that the grease hose 35 does not interfere when the robot 10 moves the lifting and lowering unit 12, the arm 13, the wrist unit 14, and the like.

The grease hose 35 of the present embodiment has a branched structure to supply grease to a plurality of locations in the robot 10. Note that a configuration may be adopted in which a plurality of grease hoses 35 are connected to the grease delivery unit 30 and the lubrication locations are different for each of the grease hoses 35. Furthermore, the grease hose 35 may branch inside the robot 10. The lubrication locations of the grease hose 35 of the present embodiment are a mechanical element (a gear, a sprocket, and the like, the same applies hereinafter) for the up-down movement of the lifting and lowering unit 12, a mechanical element for a rotational movement of the arm 13, and a mechanical element for a rotational movement of the wrist unit 14. Note that the grease delivery unit 30 may be configured to supply the lubricant not to all of the mechanical elements, but only to some of the mechanical elements.

According to the above-described configuration, in the delivery unit 2, the air pump 20 delivers air in response to the up-down movement of the lifting and lowering unit 12, and the grease delivery unit 30 supplies grease to the robot 10 in response to the delivery of air by the air pump 20. Thus, the automatic lubrication robot 1 alone performs the operation of supplying grease.

The automatic lubrication robot 1 of the present embodiment is a teaching-and-playback type robot that repeatedly performs a previously learned operation. Therefore, it is generally determined which type of up-down movement the lifting and lowering unit 12 performs at which frequency in a series of operations. Accordingly, by determining a capacity, a position, an output, and the like of the air pump 20 so that grease is supplied to the robot 10 in a necessary and sufficient amount and at a necessary and sufficient frequency, it is possible to more appropriately lubricate the robot 10. Note that the automatic lubrication robot 1 is not limited to the teaching-and-playback type robot.

A system including an electrically powered grease gun and a control device controlling the grease gun enables automatic lubrication. However, such a system requires an electrically powered grease gun and a control device, and also requires hardware and software for calculating a lubrication timing to output a command, so that the installation cost increases. In this regard, according to the present embodiment, it is possible to realize automatic lubrication by a simple configuration and without performing electric control. Note that not performing electric control is not an essential feature, and even a configuration in which electric control is performed, as described later, corresponds to the technical scope of the present invention.

Figure 2:
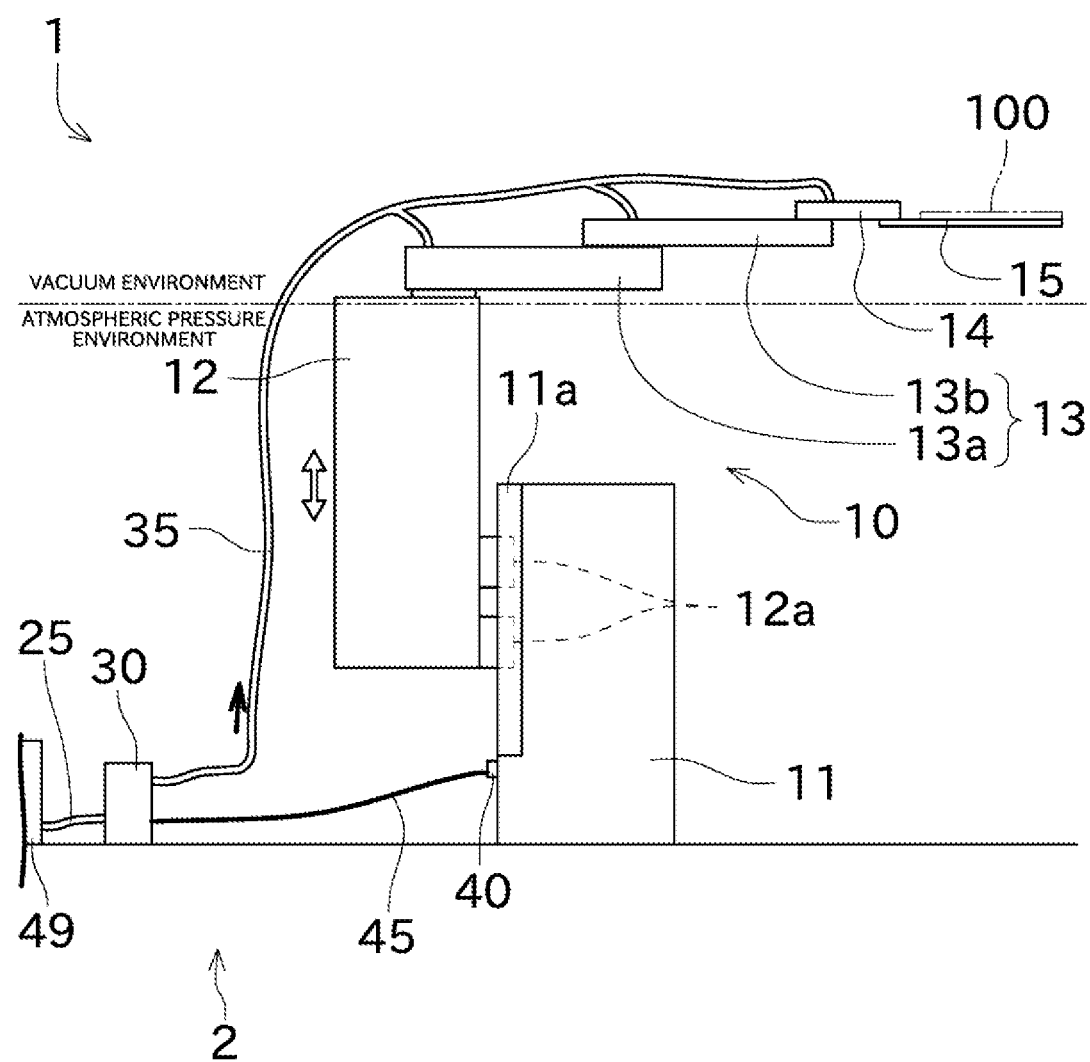
FIG. 2 is a schematic side view of an automatic lubrication robot according to a second embodiment.

Next, a second embodiment will be described with reference to FIG. 2. In the second embodiment and in subsequent embodiments, the same or similar members as those in the first embodiment are denoted by the same reference numerals in the drawings, and description thereof may be omitted.

In the configuration of the first embodiment, the lifting and lowering unit 12 presses the air pump 20. Instead of this configuration, in the second embodiment, a downward movement of the lifting and lowering unit 12 is detected, and this downward movement is used as a trigger for the grease delivery unit 30 to supply grease to the robot 10.

Specifically, the support base 11 includes a limit switch 40. For example, the limit switch 40 is arranged at a position contacting the lifting and lowering unit 12 when the lifting and lowering unit 12 is lowered to the lowest end. Thus, it can be detected that the lifting and lowering unit 12 is lowered to the lowest end. The limit switch 40 and the grease delivery unit 30 are connected by a signal line 45. Note that the limit switch 40 and the grease delivery unit 30 may be connected wirelessly instead of using a wire. Furthermore, instead of the limit switch 40, a magnet switch that detects the vicinity in a contactless manner may be used. The configuration is not limited to a configuration detecting that the lifting and lowering unit 12 is lowered to the lowest end, and a configuration detecting that the lifting and lowering unit 12 is lowered to a predetermined position (a position other than the lowest end) may be employed.

When the lifting and lowering unit 12 is lowered to the lowest end, the limit switch 40 transmits, to the grease delivery unit 30 via the signal line 45, a detection signal indicating that the lifting and lowering unit 12 is lowered to the lowest end. In the second embodiment, a compressed air source 49 is connected to the grease delivery unit 30. The compressed air source 49 supplies air to the grease delivery unit 30 via the air hose 25. That is, in the second embodiment, grease can always be supplied to the robot 10, and when the grease delivery unit 30 receives the detection signal from the limit switch 40, the grease supply unit 30 uses the detection signal as a trigger to open a valve for supplying the grease. Thus, the air supplied from the compressed air source 49 is used to supply the grease to the robot 10.

As described above, in the second embodiment, the limit switch 40 outputs a detection signal in response to the up-down movement of the lifting and lowering unit 12, and the grease delivery unit 30 supplies grease to the robot 10 in response to the detection signal. Thus, the automatic lubrication robot 1 alone performs the operation of supplying grease. The automatic lubrication robot 1 of the second embodiment can also exhibit an effect by which the hardware and the software for calculating the lubrication timing to output a command are not required.

Figure 3:
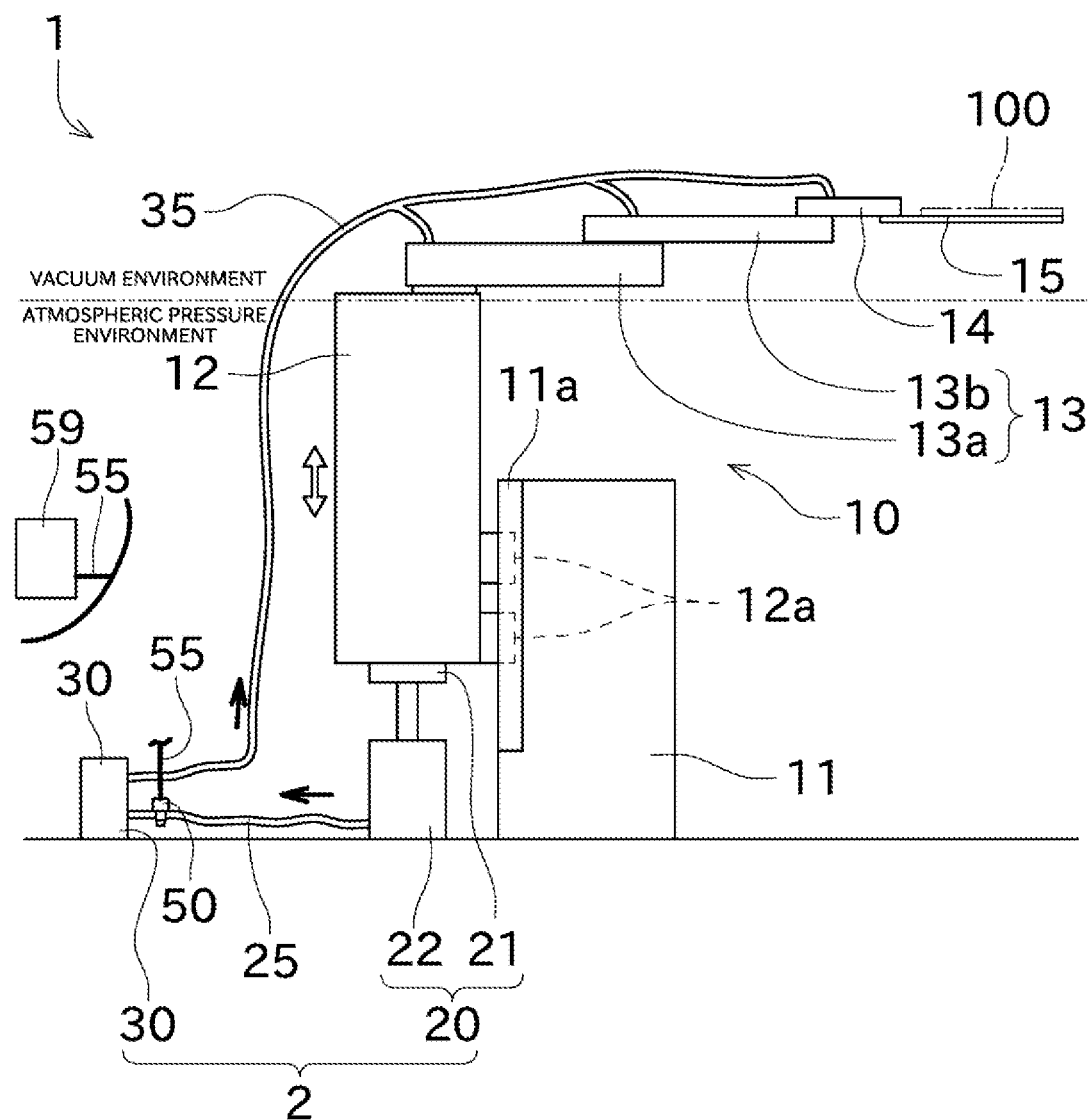
FIG. 3 is a schematic side view of an automatic lubrication robot according to a third embodiment.

Next, a third embodiment will be described with reference to FIG. 3.

According to a configuration of the third embodiment, it is possible to control the frequency of supplying grease to the robot 10. In the delivery unit 2 of the third embodiment, the air hose 25 is provided with a switching valve 50. The switching valve 50 can switch between a connected state in which the air supplied from the air pump 20 flows to the grease delivery unit 30 and an open state in which the air supplied from the air pump 20 is released to the atmosphere. A control device 59 is connected to the switching valve 50 via a signal line 55. The switching valve 50 switches between the connected state and the open state in accordance with a command from the control device 59.

When the switching valve 50 is in the connected state, the lifting and lowering unit 12 is lowered to a predetermined position, and thus, the air pump 20 supplies air to the grease delivery unit 30, so that grease is supplied to the robot 10 (a first state). Hereinafter, the predetermined position will be referred to as an operating position. That is, the operating position is a position of the lifting and lowering unit 12, and is a position where it is possible to deliver sufficient air to supply the grease. When the switching valve 50 is in the open state, the air supplied by the air pump 20 is released to the atmosphere, even if the lifting and lowering unit 12 is lowered to the operating position, so that grease is not supplied to the robot 10 (a second state). Accordingly, upon determining that a timing requiring lubrication is reached, the control device 59 switches the switching valve 50 from the open state to the connected state, and thus, it is possible to supply grease to the robot 10 at a necessary and sufficient frequency.

Also in the automatic lubrication robot 1 of the third embodiment, the power by which the lifting and lowering unit 12 is lowered can be used to deliver the grease, so that it is possible to exhibit an effect in which the need for an electric grease gun or the like is eliminated.

Instead of the configuration in which the switching valve 50 is provided in the air hose 25, the switching valve 50 may be provided in the grease hose 35. In this case, the grease hose 35 includes a supply path for supplying the grease to the robot 10 and a return path for returning the grease to the grease delivery unit 30. The switching valve provided in the grease hose 35 can switch between a state in which the grease supplied from the grease delivery unit 30 is supplied to the robot 10, and a state in which the grease supplied from the grease delivery unit 30 is returned to the grease delivery unit 30 by using the return path.

Figure 4:
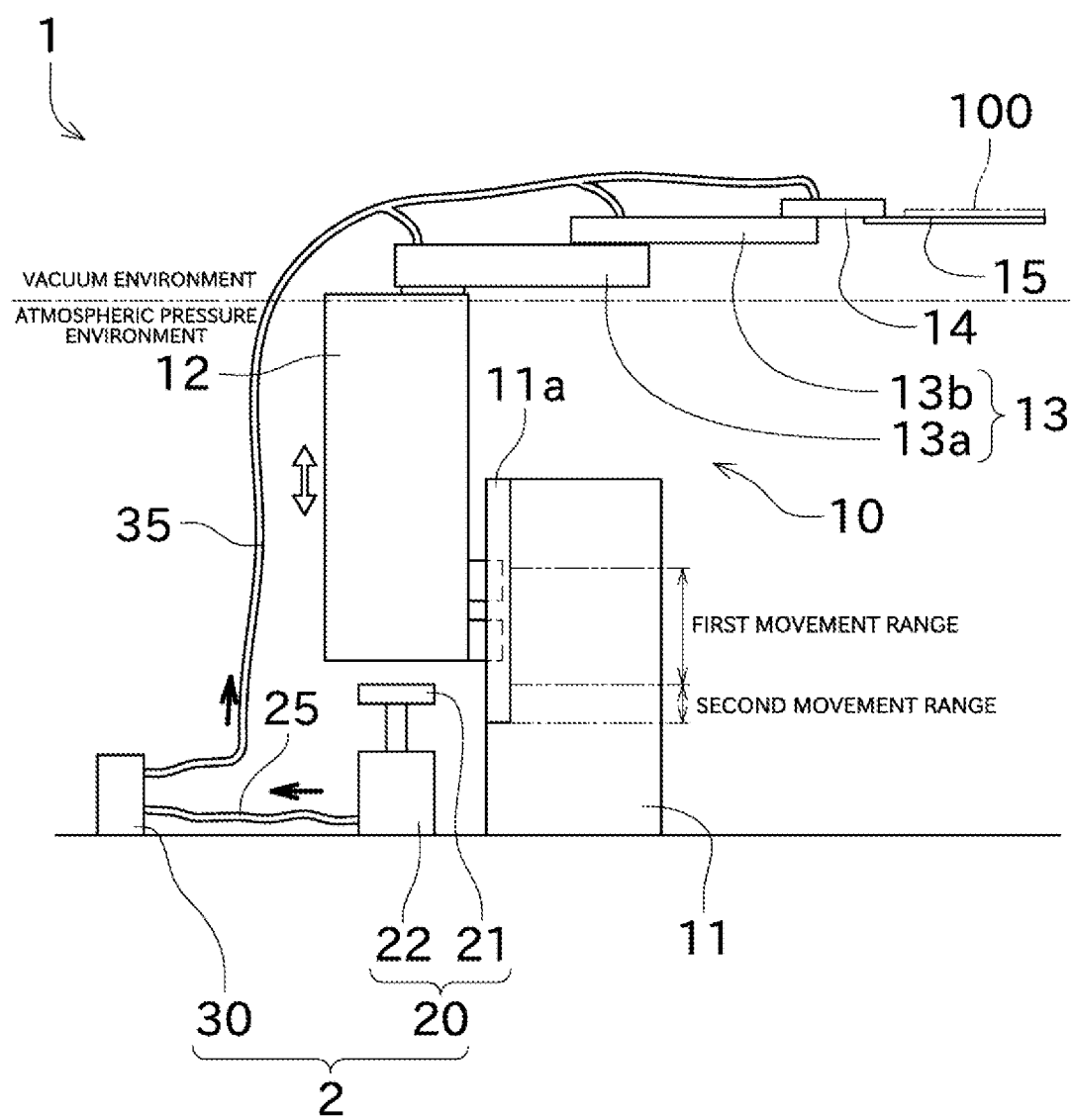
FIG. 4 is a schematic side view of an automatic lubrication robot according to a fourth embodiment.

Next, a fourth embodiment will be described with reference to FIG. 4.

The automatic lubrication robot 1 of the fourth embodiment is the same as the automatic lubrication robot 1 of the first embodiment with respect to the configuration of each device. In the fourth embodiment, a movement range of the lifting and lowering unit 12 and an arrangement of the air pump 20 are different from the first embodiment.

Specifically, a range in which the lifting and lowering unit 12 can move is divided into a first movement range and a second movement range. In an operation repeatedly performed by the robot 10, the lifting and lowering unit 12 generally moves within the first movement range, and the lifting and lowering unit 12 generally does not need to move within the second movement range. The air pump 20 is arranged (specifically, a position of the contact unit 21 is adjusted) so that the lifting and lowering unit 12 does not contact the contact unit 21, even if the lifting and lowering unit 12 moves within the first movement range. That is, in the operation repeatedly performed by the robot 10, the air pump 20 does not deliver air. On the other hand, when the lifting and lowering unit 12 reaches the second movement range, the lifting and lowering unit 12 presses the contact unit 21 and the air pump 20 delivers air.

The robot control device that controls the robot 10 moves the lifting and lowering unit 12 to the second movement range every time the robot control device determines that the lubrication timing is reached (or in a predetermined period). Thus, the grease can be supplied to the robot 10 at a necessary and sufficient frequency.

Figure 5:
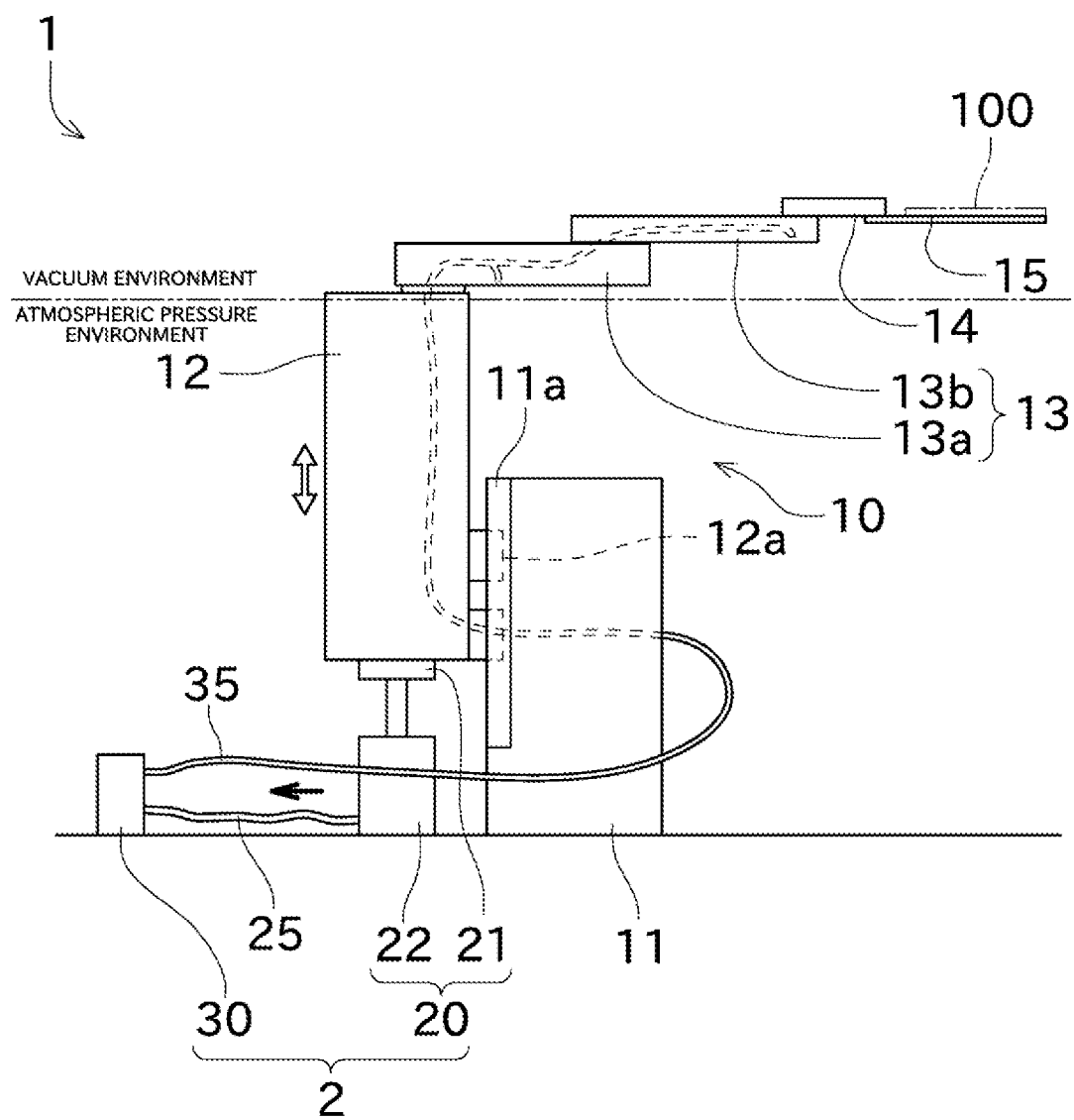
FIG. 5 is a schematic side view of an automatic lubrication robot according to a fifth embodiment.

Next, a fifth embodiment will be described with reference to FIG. 5.

The grease hose 35 of the fifth embodiment is routed inside the cover of the robot 10. Specifically, the grease hose 35 is inserted from an insertion hole provided in the support base 11 and is routed to the arm 13 via the lifting and lowering unit 12. Furthermore, the grease hose 35 has a branched structure within the arm 13, and can supply lubricant to each of the first arm 13a and the second arm 13b.

In the automatic lubrication robot 1 of the fifth embodiment, it is not necessary to provide a structure for attaching the grease hose 35 to a cover of the arm 13 (vacuum-to-tail attachment hole). Moreover, when the arm 13 is operated, the arm 13 does not interfere with the grease hose 35.

As described above, the automatic lubrication robot 1 of the first to fifth embodiments includes the robot 10, the grease hose 35, and the delivery unit 2. The robot 10 includes the lifting and lowering unit 12 that moves linearly and the arm 13 coupled to the lifting and lowering unit 12, and the robot 10 is arranged in a clean room to perform an operation. The grease for lubricating the robot 10 passes through the grease hose 35. In response to the linear movement of the lifting and lowering unit 12, the delivery unit 2 delivers the grease to the robot via the grease hose 35.

Thus, the grease can be automatically supplied to the robot 10, so that the amount of work can be reduced. Furthermore, the grease is supplied due to the movement of the lifting and lowering unit 12 of the robot 10, and thus, no complicated adjustment is required.

In the automatic lubrication robot 1 of the first to fifth embodiments, the delivery unit 2 has a function of delivering air, and delivers air in response to the linear movement of the lifting and lowering unit 12, to deliver grease to the grease hose 35.

Therefore, grease can be supplied to the robot 10 by using a general type of the grease delivery unit 30 utilizing air.

In the automatic lubrication robot 1 of the first embodiment and the third to fifth embodiments, the delivery unit 2 includes the air pump 20 and the grease delivery unit 30. The air pump 20 delivers air in response to a pressing force from the lifting and lowering unit 12. The grease delivery unit 30 delivers grease by using the air delivered by the air pump 20.

Thus, by utilizing the pressing force of the lifting and lowering unit 12, grease can be supplied to the robot 10, without separately providing a compressor or the like.

In the automatic lubrication robot 1 of the first to fifth embodiments, the grease delivery unit 30 is arranged in an atmospheric pressure environment.

Therefore, it is not necessary to implement vacuum countermeasures in the grease delivery unit 30, so that the cost can be reduced compared to a configuration in which the grease delivery unit 30 is arranged in a vacuum environment.

In the automatic lubrication robot 1 of the first to fifth embodiments, the arm 13 is arranged in a vacuum environment.

Thus, compared to a method of manually supplying a lubricant to a vacuum robot, it is possible to greatly reduce the amount of work by a worker and to suppress an increase in downtime.

In the automatic lubrication robot 1 of the first to fifth embodiments, the lifting and lowering unit 12 is a unit that moves up and down. In response to the up-down movement of the lifting and lowering unit 12, the delivery unit 2 delivers grease to the robot via the grease hose 35.

Therefore, the degree of freedom in arranging the air pump 20 and the like can be increased compared to a configuration utilizing a linear movement unit that moves horizontally.

In the automatic lubrication robot 1 of the first to fifth embodiments, the grease hose 35 is branched and grease is supplied to a plurality of locations of the robot 10.

Thus, grease can be collectively supplied to a plurality of lubrication locations.

The automatic lubrication robot 1 of the third embodiment can switch between a first state and a second state. In the first state, the delivery unit 2 supplies grease to the robot when the lifting and lowering unit 12 linearly moves to the operating position. In the second state, the delivery unit 2 does not supply grease to the robot, even if the lifting and lowering unit 12 linearly moves to the operating position.

In the automatic lubrication robot 1 of the fourth embodiment, the lifting and lowering unit 12 is movable over a first movement range used for an operation by the robot 10 and a second movement range outside the first movement range. The delivery unit 2 does not supply grease to the robot 10 when the lifting and lowering unit 12 moves within the first movement range, and supplies grease to the robot 10 when the lifting and lowering unit 12 moves within the second movement range.

Therefore, grease is unlikely to be supplied to the robot 10 when it is not necessary.

Above, preferred embodiments of the present invention are described. However, the configurations described above can be modified, for example, as follows.

In the above-described embodiments, the delivery unit 2 delivers the grease to the robot 10 in response to the up-down movement of the lifting and lowering unit 12 of the automatic lubrication robot 1. Alternatively, when the automatic lubrication robot 1 includes a linear movement unit that moves linearly in the horizontal direction, the delivery unit 2 may deliver grease to the robot 10 in response to the movement of the linear movement unit.

The grease hose 35 of the above-described embodiments includes a branched structure, but the grease hose 35 may not include the branched structure.

The grease delivery unit 30 may be arranged in a vacuum environment instead of the atmospheric pressure environment. Furthermore, the grease delivery unit 30 is not limited to a method of delivering grease by air. For example, the grease delivery unit 30 may include an impeller in the supply path of the grease, and the grease may be delivered by rotating the impeller. In this case, a power transmission mechanism may be provided that rotates the impeller in response to the up-down movement of the lifting and lowering unit 12.

The automatic lubrication robot 1 of the above-described embodiments operates in a vacuum environment. However, the automatic lubrication robot 1 may be configured to operate in an atmospheric pressure environment.

The invention claimed is:

1. An automatic lubrication robot, comprising:
   a robot including a linear movement unit performing a linear movement and an arm coupled to the linear movement unit, the robot being arranged in a clean room to perform an operation;
   a supply path through which a lubricant for lubricating the robot passes; and
   a delivery unit configured to deliver the lubricant to the robot via the supply path, in response to the linear movement of the linear movement unit,
   wherein the delivery unit has a function of delivering air, and delivers the air in response to the linear movement of the linear movement unit, to deliver the lubricant to the supply path, and
   the delivery unit includes
      a first delivery unit configured to deliver the air in response to a pressing force from the linear movement unit; and
      a second delivery unit configured to deliver the lubricant by the air delivered by the first delivery unit.

2. The automatic lubrication robot according to claim 1, wherein
   the second delivery unit is arranged in an atmospheric pressure environment.

3. The automatic lubrication robot according to claim 1, wherein
   the arm is arranged in a vacuum environment.

4. The automatic lubrication robot according to claim 1, wherein
   the linear movement unit is a unit configured to perform an up-down movement, and
   the delivery unit delivers the lubricant to the robot via the supply path, in response to the up-down movement of the linear movement unit.

5. The automatic lubrication robot according to claim 1, wherein
   the supply path is branched and the lubricant is supplied to a plurality of locations of the robot.

6. The automatic lubrication robot according to claim 1, being switchable between
   a first state in which the delivery unit supplies the lubricant to the robot when the linear movement unit linearly moves to an operating position; and
   a second state in which the delivery unit does not supply the lubricant to the robot when the linear movement unit linearly moves to the operating position.

7. The automatic lubrication robot according to claim 1, wherein
   the linear movement unit is movable over a first movement range used for an operation by the robot and a second movement range outside the first movement range, and
   the delivery unit does not supply the lubricant to the robot when the linear movement unit moves within the first movement range, and supplies the lubricant to the robot when the linear movement unit moves within the second movement range.

* * * * *